United States Patent Office 2,885,384
Patented May 5, 1959

2,885,384

BIS(HYDROXYPHENYL)ALKANE REACTED WITH POLYORGANO-SILOXANE RESINS

Samuel Sterman, Snyder, N.Y., assignor to Union Carbide Corporation, a corporation of New York No Drawing. Application May 25, 1954
Serial No. 432,327

16 Claims. (Cl. 260—46.5)

This invention relates to new compositions of matter, comprising silicon containing polymers, especially suitable for use as coating materials. More particularly, the invention relates to new compositions of matter comprising modified polysiloxanes and to a process for the preparation thereof.

Organopolysiloxanes have become widely known as they possess numerous desirable properties which warrant their use in a wide variety of applications. For example, they possess a high dielectric capacity, chemical inertness, and excellent resistance to oxidation. These characteristics together with their extreme resistance to thermal degradation when compared with other known organic polymer materials have suggested their use as coating compositions. However, such use has not met with wide acceptance in the art as coatings prepared from organopolysiloxanes were found to lack satisfactory flexibility and tensile strength characteristics found in many organic polymers. In addition it was found that when compared to organic polymers, organopolysiloxanes possessed a slow cure rate and required the use of extraordinarily high temperatures to effect curing.

It has been suggested that coating compositions having many of the superior characteristics of organopolysiloxanes and also many of the desirable properties of the organic polymers, heretofore lacking, might be produced by combining therewith an organic polymer. For example, the use of blends of organopolysiloxanes and polymeric organic materials such as alkyd resins have been proposed as coating compositions. However, this proposal has not proven entirely satisfactory due to the incompatibility of the two types of polymers. Another proposal included the effecting of a chemical union between organopolysiloxanes and alkyd resins. Usually, materials of this type are prepared by reacting under appropriate conditions a partially condensed polysiloxane, that is, one containing hydroxyl or alkoxy radicals bonded to some of the silicon atoms of the polymer, with alkyd or oil-modified alkyd resins containing free hydroxyl or carboxyl radicals. While copolymers of this type have improved overall properties as compared to organopolysiloxanes they appear to retain, to a slightly lesser extent, the undesirable characteristics of low tensile strength and poor flexibility. Moreover they lack the uniformly high quality essential to a commercial product in that the copolymer shows a haziness, indicative of partial incompatibility, which oftentimes has marked adverse effect on marketability.

The cause of the noted characteristics found in organo-polysiloxane-alkyd copolymers is attributed to the fact that each of the starting materials employed contains numerous reactive groups which may result during the reaction in excessive inter-molecular condensation or in incomplete intermolecular condensation with accompanying intra-molecular condensation. Excessive inter-molecular condensation leads to a highly cross-linked product and may occur either during the preparation of the composition to be cured or in the curing process. In the first instance an insoluble, and infusible material is obtained which is difficult to apply as a coating and when it occurs in the second instance, an extremely brittle final product is obtained. When incomplete inter-molecular condensation and accompanying intra-molecular condensation occurs, the product obtained is not a true copolymer but instead comprises, for the most part, a mixture of homopolymers of the polysiloxane and alkyd resin.

More recently it has been proposed to prepare modified organopolysiloxanes by initially reacting a partially condensed polysiloxane with glycerol and subsequently reacting the product with a dicarboxylic acid. Modifications of this process include reacting a polysiloxane with a polycarboxylic acid and subsequently reacting the product with either glycerol or a glycerol-acid polyester. The products obtained by such processes although useful for certain limited applications are not entirely satisfactory as they are characterized by the inherent deficiencies found in organopolysiloxane-alkyd copolymers. As each of the materials employed to modify the organopolysiloxanes, that is glycerol, polycarboxylic acids and polyesters thereof, contains numerous reactive groups, condensation oftentimes occurs among the modifying materials and consequently a uniformly cross-linked product is rarely obtained.

It is an object of this invention to provide new compositions of matter, suitable for use as coating compositions, comprising modified organopolysiloxanes having many of the superior characteristics of unmodified organopolysiloxanes and also many of the desirable properties of organic polymers which new compositions may be readily cured at relatively low temperatures.

The new compositions of matter of the present invention are modified organopolysiloxanes having a molecular structure comprising a plurality of recurring polysiloxane portions, containing monovalent silicon-bonded hydrocarbyl groups, connected by divalent substituted alkane radicals. More specifically, the new polymers have a molecular structure comprising a plurality of recurring phenyl, or phenyl and methyl polysiloxane portions connected by divalent bis (oxyphenyl) substituted alkane radicals through silicon-oxygen-carbon linkages.

In accordance with this invention the new polymers can be prepared by reacting a member of a specific class of phenyl polysiloxanes or of phenyl and methyl polysiloxanes having a definite and well defined molecular composition with a member of a specific class of bis (hydroxyphenyl) substituted alkanes. The siloxanes employed as starting materials are relatively low molecular weight, partially condensed, phenyl polysiloxanes or phenyl and methyl polysiloxanes containing reactive hydrocarbyloxy groups, preferably alkoxy groups, bonded to some or all of the silicon atoms thereof. These siloxane intermediates have a hydrocarbyl group to silicon atom ratio of from about 1.0 to 1.6 where, of course, the hydrocarbyl group may be phenyl or a mixture of methyl and phenyl groups. In the latter instance, where the polysiloxane contains both phenyl and methyl groups bonded to silicon atoms, not over 60 percent of the total number of such groups are methyl groups. The hydrocarbyloxy groups bonded to the silicon atoms of the intermediate are present in an amount such that the hydrocarbyloxy group to silicon atom ratio will be in a range of from about 0.2 to as high as 2 and generally will be in the range of from about 0.3 to 1.5. However, in no event will the percent by weight of hydrocarbyloxy groups present be less than 5 percent nor more than 60 percent of the weight of the polysiloxane. Polysiloxanes of the molecular composition described above have a molecular weight of from about 400 to about 4,000.

The manner whereby the desired polysiloxanes containing silicon-bonded hydrocarbyloxy radicals can be prepared may vary in accordance with several techniques. I may employ as starting materials any of the well known hydrolyzable derivatives of phenyl silanes or mixtures of hydrolyzable derivatives of phenyl silanes and methyl silanes. Such silane derivatives have the valences of the silicon atom thereof satisfied by only the hydrocarbyl groups specified and by any of the known hydrolyzable radicals or elements such as halogens or alkoxy, aryloxy and amino radicals. Thus the silane derivatives may contain from 1 to 3 phenyl or methyl groups and from 3 to 1 hydrolyzable groups bonded to the silicon atom.

To prepare the siloxane intermediates employed in the processes of my invention from alkoxy silanes, a controlled hydrolysis and partial condensation method is preferably employed. Hydrolysis is conducted by treating a solvent solution of an alkoxy silane, at carefully controlled temperatures with an amount of water less than that normally required to effect complete hydrolysis of the derivative. Condensation occurs, to some extent, concurrently with hydrolysis and the degree thereof may be controlled by the addition of a catalyst or by varying the temperature.

When other hydrolyzable silanes such as the halosilanes are employed as the starting materials one of two procedures may be followed to prepare the polysiloxanes. For example, these hydrolyzable derivatives may be initially reacted with alcohol, preferably an alkanol, to produce an alkoxy silane which may be subsequently hydrolyzed and condensed as disclosed above, or they may be treated with an alcohol and water mixture in the presence of a solvent. In the latter instance the total amount of alcohol and water employed is such as to completely react with the available hydrolyzable radicals of the silane derivative. Thus both the water and alcohol react with the silane and the hydrolyzable radicals are replaced by either an alkoxy radical or by a hydroxyl radical. The hydroxyl radicals condense intermolecularly to form the alkoxy-containing polymers.

The bis (hydroxyphenyl) substituted alkanes which are employed to prepare the new polymers of this invention include such compounds as bis (4-hydroxyphenyl) methane, 1,1-bis (4-hydroxyphenyl) ethane, 2,2-bis (4-hydroxyphenyl) propane, 1,1-bis (4-hydroxyphenyl) isobutane, 2,2-bis (4-hydroxyphenyl) butane, bis (2-hydroxyphenyl) methane and the like. The preferred bis (hydroxyphenyl) alkanes which may be employed in the invention are those wherein the alkane portion contains from one to four carbon atoms. If desired, mixtures of the above hydroxyphenyl substituted alkanes may be reacted with the hydrocarbyloxy-containing polysiloxanes to yield new modified polysiloxanes.

The process whereby the new polymers of my invention are prepared generally comprises reacting stoichiometric amounts of a bis (hydroxyphenyl) substituted alkane with a hydrocarbyloxy-containing polysiloxane. This reaction is a typical transesterification reaction and may be conducted with or without the benefit of a solvent at a temperature of from about 180° C. to about 250° C. If desired various catalysts including the conventional transesterification catalysts may be employed to increase the rate of the reaction. Of the catalysts which may be employed I prefer the alkaline catalysts, specifically, alkaline potassium catalysts such as the potassium silanolates.

Modifications of the process include variations in the amount of the bis (hydroxyphenyl) substituted alkanes employed in the reaction. Thus, in place of reacting one equivalent weight of a bis (hydroxyphenyl) substituted alkane with one equivalent weight of a hydrocarbyloxy-containing polysiloxane, I may react as little as 0.8 equivalent weights to as much 2.0 equivalent weights of the substituted alkane with each equivalent weight of the polysiloxane. Such modifications in the process make possible the preparation of modified polymers having varying amounts of polysiloxane and consequently varying properties.

An example of a process of this invention comprises reacting in a flask connected to a condenser one equivalent weight of a bis (hydroxyphenyl) substituted alkane (based on its hydroxyl content) and one equivalent weight of a hydrocarbyloxy-containing polysiloxane (based on its hydrocarbyloxy content), in the presence of a xylene solvent at a temperature within the limits set forth above. During the reaction the solvent and an alcohol are evolved and heating is continued until the viscosity increase of the contents of the flask indicates that bodying is imminent. The polymeric product is then dissolved in a suitable solvent until use at which time it is applied to a surface and cured.

The amount of the bis (hydroxyphenyl) alkane in grams which comprises one equivalent weight may be readily determined by dividing the molecular weight of the substituted alkane by two as there are only two reactive hydroxyl groups in the molecule. With respect to the polysiloxane the amount in grams which comprises an equivalent weight may be determined by dividing the molecular weight of the reactive hydrocarbyloxy group by the weight percent of the hydrocarbyloxy groups in the molecule. For example, when an ethoxy containing polysiloxane is employed one equivalent weight thereof is determined by dividing the molecular weight of the group, which is 45, by the weight percent of ethoxy groups, contained by the polysiloxane.

One embodiment of this invention comprises the addition of minor amounts of cure accelerators or hardening ingredients such as phenolic resins, urea formaldehyde resins, melamine formaldehyde resins, or minor amounts of polyhydric alcohols for example glycol, glycerol or pentaerythritol. The resin materials are commercially available in solvent solutions and may be readily mixed with solvent solutions of the modified organopolysiloxanes of this invention. In general, these resins when employed are added in an amount of, from about 5 percent to about 20 percent by weight of the modified organopolysiloxane. The latter modifying materials if employed are normally added in various amounts to the reaction mixture of the hydrocarbyloxy-containing polysiloxane and the hydroxyl-containing substituted alkane to provide an excess of hydroxy groups. In such instances a slightly more brittle product is obtained which may have various specific applications.

To obtain more flexible and consequently less brittle coatings a portion of the bis (hydroxyphenyl) substituted alkane employed to react with a hydrocarbyloxy-containing polysiloxane may be replaced with a monohydric alcohol. In such instances these monohydric alcohols serve as chain end-blocking compounds and limit the extent of cross-linking. Although aliphatic monohydric alcohols may be employed, I prefer to use the aromatic monohydric alcohols such as phenol, p-hydroxy diphenyl, p-nonyl phenol and the like. Generally these end-blocking compounds when employed are added in an amount by equivalent weight which will replace up to about one half of the equivalent weight of the bis (hydroxyphenyl) substituted alkane which may be reacted. Thus for example one equivalent weight of an ethoxy containing polysiloxane may be reacted with one-half equivalent weight of a bis (hydroxyphenyl) substituted alkane and one-half equivalent weight of p-nonyl phenol.

The invention may be illustrated by the following examples which disclose the preparation of various modified polysiloxanes and the results of determinations conducted with respect to enamel life and resistance to boiling water and to solutions of acids and bases of coatings prepared therefrom. The enamel life was found by placing coated steel panels in an air oven at a temperature of 200° C. and periodically examining the panels to determine the condition of the coating. In general coatings which exhibit good gloss characteristics and freedom from crazing or peeling after 250 hours are deemed acceptable for commercial applications.

Example I

A phenyl and methyl polysiloxane containing ethoxy groups bonded to some of the silicon atoms thereof was prepared by treating a mixture comprising 60 mole percent phenyl trichlorosilane, 20 mole percent diphenyl dichlorosilane and 20 mole percent dimethyl dichlorosilane with a water-ethanol mixture in the presence of a solvent. The polymer had hydrocarbyl group to silicon atom ratio of 1.4, phenyl group to methyl group ratio of 2.5, an ethoxy group to silicon atom ratio of 0.38 and contained 17.4 percent by weight of ethoxy groups.

To a 3-neck, 3-liter flask equipped with stirrer, thermometer, condenser and take-off trap, were charged one equivalent weight (258 grams) of the above polysiloxane, slightly less than one equivalent (100 grams) of 2,2-bis (4-hydroxyphenyl) propane, a small amount of potassium silanolate (0.02–0.04 percent by weight potassium of the weight of the mixture) together with sufficient xylene to aid solution of the ingredients. The charge was heated with nitrogen purging to a temperature in the range of 200° C. to 250° C. and xylene and ethanol were evolved during the reaction and collected in the trap. Heating was continued until the viscosity increase of the reaction mixture indicated that bodying was imminent at which time additional xylene was added and the viscosity of the solution adjusted to about 100 cstks. The solution was pigmented with titania, applied in a thickness of 1.5 mils to steel panels and cured in ½ hour at 200° C. to a hard, high-gloss, white finish. It was found that after exposure for 800 hours to a temperature of 200° C. in an air oven the coatings had retained their initial high gloss and color characteristics. The coatings were also found to be resistant to deterioration when immersed in boiling water for three hours and when immersed in 3 percent solutions of hydrochloric acid and sodium hydroxide for 70 hours.

Example II

A phenyl polysiloxane containing ethoxy groups bonded to some of the silicon atoms thereof was prepared by treating phenyl trichlorosilane with a water-ethanol mixture in the presence of a solvent. The polymer had a phenyl group to silicon atom ratio of one, an ethoxy group to silicon atom ratio of 0.94, a molecular weight of 1050, and contained 25.4 percent by weight ethoxy groups.

To a 3-liter, 3-neck flask equipped with stirrer, thermometer, condenser and take-off trap were charged approximately 1 equivalent weight (185 grams) of the above polysiloxane, 1 equivalent weight (114 grams) of 2,2-bis (4-hydroxyphenyl) propane and sufficient xylene to aid solution of the reactants. The charge was heated with nitrogen purging to a temperature ranging from 200° C. to 250° C. and xylene and ethanol were evolved during the reaction and collected in the trap. Heating was continued until the viscosity increase of the reaction mixture indicated that bodying was imminent at which time additional xylene was added and the viscosity of the solution adjusted to about 100 cstks. The solution was pigmented with titania, applied in a thickness of 1.5 mils to steel panels and cured in ½ hour at 200° C. to a hard, high-gloss white finish. After exposure to a temperature of 200° C. in an air oven for 340 hours, the coatings were found to have retained their initial excellent gloss and color characteristics. The coatings were also found resistant to deterioration when immersed in boiling water for three hours and when immersed in 3 percent solutions of hydrochloric acid and sodium hydroxide for 70 hours.

Example III

To a 3-liter, 3-neck flask equipped with stirrer, thermometer, condenser and take-off trap were charged approximately one equivalent weight (185 grams) of a polysiloxane identical in composition to that employed in Example II, 0.57 equivalent weights (65 grams) of 2,2-bis (4-hydroxyphenyl) propane, 0.36 equivalent weights (80 grams) of p-nonyl phenol, a small amount of potassium silanolate (0.02–0.03 percent by weight of potassium of the total weight of reactants) and sufficient xylene to aid solution of the ingredients. The charge was heated with nitrogen purging to a temperature ranging from 200° C. to 225° C. Xylene and ethanol were evolved during the reaction and collected in the trap. Heating was continued until the viscosity increase of the reaction mixture indicated that bodying was imminent at which time additional xylene was added and the viscosity of the solution adjusted to about 100 cstks. The solution was pigmented with titania, applied in a thickness of 2 mils to steel panels and cured in one-half hour at 200° C. to a hard, high-gloss white finish. It was found that after exposure for a period of 230 hours to temperature of 200° C. the coatings exhibited satisfactory gloss and color characteristics with only a moderate amount of crazing. The coatings were also found resistant to deterioration when immersed in boiling water for three hours and when immersed in 3 percent solutions of hydrochloric acid and sodium hydroxide for 70 hours.

Example IV

To a 3-liter, 3-neck flask equipped with stirrer, thermometer, condenser and take-off trap were charged approximately 1.3 equivalent weights (230 grams) of a polysiloxane identical in composition to that employed in Example II, 0.48 equivalent weights (54 grams) of 2,2-bis (4-hydroxyphenyl) propane, 0.50 equivalent weights (80 grams) of p-hydroxy diphenyl, a small amount of potassium silanolate (0.02–0.03 percent by weight of potassium of the total weight of reactants) and sufficient xylene to aid solution of the ingredients. The charge was heated to a temperature ranging from 200° C. to 225° C. Xylene and ethanol were evolved during the reaction and collected in the trap. Heating was continued until the viscosity increase of the reaction mixture indicated that bodying was imminent at which time additional xylene was added and the viscosity of the solution adjusted to about 100 cstks. The solution was pigmented with titania, applied in a thickness of 1.5 mils to steel panels and cured in one-half hour at 200° C. to a hard, high-gloss white finish. It was found that after exposure for 570 hours to a temperature of 200° C. the coatings possessed good gloss characteristics, retained their initial color and that only slight crazing had occurred. The coatings were also found resistant to deterioration when immersed in boiling water for 3 hours and when immersed in 3 percent solutions of hydrochloric acid and sodium hydroxide for 70 hours.

Example V

To a 3-liter, 3-neck flask equipped with stirrer, thermometer, condenser and take-off trap were charged 1.1 equivalent weights (195 grams) of a polysiloxane identical in composition to that employed in Example II, 0.71 equivalent weights (81 grams) of 2,2-bis (4-hydroxyphenyl) propane, 0.27 equivalent weights (13.2 grams) diethylene glycol, a small amount of potassium silanolate (0.02–0.03 percent by weight of potassium of the total weight of reactants) and sufficient xylene to aid solution of the ingredients. The charge was heated to a temperature ranging from 200° C. to 225° C. and xylene and ethanol evolved during the reaction. Heating was continued until the viscosity increase of the reaction mixture indicated that bodying was imminent at which time additional xylene was added and the viscosity of the solution adjusted to 100 cstks. The solution was pigmented with titania, applied in a thickness of 2 mils to steel panels and cured in one-half hour at 200° C. to a hard, high-gloss white finish. It was found that after exposure for 400 hours to a temperature of 200° C. the coatings had retained their initial high gloss and color characteristics. The coatings were also found resistant to deterioration when immersed in boiling water for 3 hours and when immersed in 3 percent solutions of hydrochloric acid and sodium hydroxide for 70 hours.

Example VI

A phenyl and methyl polysiloxane containing ethoxy groups bonded to some of the silicon atoms thereof was prepared by treating a mixture comprising 60 mole percent phenyl trichlorosilane and 40 percent dimethyl dicholorsilane with a water-ethanol mixture in the presence of a solvent. The polymer had a hydrocarbyl group to silicon atom ratio of 1.4, a phenyl group to methyl group ratio of 0.75, an ethoxy group to silicon atom ratio of 0.6, a molecular weight of 1150 and contained 20 percent by weight of ethoxy groups To a 3-liter, 3-neck flask equipped with stirrer, thermometer, condenser and take-off trap were charged one equivalent weight (220 grams) of the above polysiloxane, approximately one equivalent weight of 2,2-bis (4-hydroxyphenyl) propane and sufficient xylene to aid solution of the reactants. The charge was heated to a temperature in the range of 200° C. to 250° C. and xylene and ethanol were evolved during the reaction. Heating was continued until the viscosity increase of the reaction mixture indicated that bodying was imminent at which time additional xylene was added and the viscosity of the solution adjusted to about 100 cstks. The solution was pigmented with titania, applied in a thickness of 1.5 mils to steel panels and cured in one-half hour at 200° C. to a hard, high-gloss white finish. It was found that after exposure to a temperature of 200° C. in an air oven for a period of 500 hours that the coatings had retained their initial high-gloss and color characteristics. The coatings were also found resistant to deterioration when immersed in boiling water for three hours and when immersed in 3 percent solutions hydrochloric acid and sodium hydroxide for 70 hours.

Example VII

Following the procedure disclosed in Example VI one equivalent weight of a phenyl and methyl polysiloxane identical in composition to that employed therein was reacted with one equivalent weight of 2,2-bis (hydroxyphenyl) propane and 0.6 equivalent weights (20 grams) of glycerol in the presence of sufficient xylene to aid solution of the ingredients at a temperature in the range of 200° C. to 225° C. Heating was discontinued when the viscosity increase of the reaction mixture indicated that bodying was imminent at which time additional xylene was added and the viscosity of the solution adjusted to about 100 cstks. The solution was pigmented with titania, applied in a thickness of 1.5 mils to steel panels and cured in one-half hour at 200° C. to a hard, high-gloss white finish. It was found that after exposure to a temperature of 200° C. for a period of 275 hours that the coatings possessed good gloss and color characteristics. The coatings were resistant to deterioration when immersed in boiling water for three hours and when immersed in 3 percent solutions of hydrochloric acid and sodium hydroxide.

Example VIII

To a modified polysiloxane prepared in a manner disclosed in Example VII, was added 10 percent by weight of a melamine resin sold by the Rohm & Haas Corp. under the trade name "Uformite MM-55." The ingredients were thoroughly mixed and applied to steel panels in a thickness of 1.5 mils and cured in one-half hour at 200° C. to a hard, white finish After exposure to a temperature of 200° C. for a period of 400 hours the coatings were found to exhibit satisfactory gloss and color characteristics. The coatings were resistant to deterioration when subjected to boiling water and dilute solutions of hydrochloric acid and sodium hydroxide.

Example IX

A methyl and phenyl polysiloxane containing ethoxy groups bonded to some of the silicon atoms thereof was prepared by treating a mixture comprising 60 mole percent phenyl trichlorosilane and 40 mole percent dimethyl dichlorosilane with a water-ethanol mixture in the presence of a solvent. The polymer had hydrocarbyl group to silicon atom ratio of 1.4, a phenyl group to methyl group ratio of .75, an ethoxy group to silicon atom ratio of 0.33, a molecular weight of 2400 and contained 12 percent by weight of ethoxy groups.

To a 3-liter, 3-neck flask equipped with stirrer, thermometer, condenser and take-off trap were charged one-half equivalent weight (188 grams) of the above polysiloxane, approximately one-half the equivalent weight (50 grams) of 2,2-bis (4-hydroxyphenyl) propane, a small amount of potassium silanolate (0.02–0.03 percent by weight potassium of the total weight of the reactants) and sufficient xylene to aid solution. The charge was heated with nitrogen purging to a temperature ranging from 200° C. to 250° C. and xylene and ethanol evolved during the reaction. Heating was continued until the viscosity increase of the reaction mixture indicated that bodying was imminent at which time additional xylene was added and the viscosity of the solution adjusted to about 100 cstks. The solution was pigmented with titania, applied in a thickness of 1.5 mils to steel panels and cured in one-half hour at 200° C. to a hard, high-gloss finish. It was found that after subjection to a temperature of 200° C. for a period of 600 hours the coatings exhibited excellent gloss and color characteristics and that no crazing had occurred. The coatings were also found to be resistant to deterioration when immersed in boiling water for 3 hours and when immersed in 3 percent solutions of hydrochloric acid and sodium hydroxide for 70 hours.

Example X

Approximately one equivalent weight of a phenyl and methyl polysiloxane having an ethoxy group to silicon atom ratio of 0.8, a hydrocarbyl group to silicon atom ratio of 1.4 and a phenyl group to methyl group ratio of .75, a molecular weight of 750 and containing 25.4 percent by weight of ethoxy groups was reacted with approximately one equivalent (100 grams) of 2,2-bis (4-hydroxyphenyl) propane in the presence of 0.2 percent by weight of perfluoro glutaric acid and sufficient xylene to insure a solution of the reactants. The reaction was conducted at a temperature of from 200° C. to 250° C. and heating was discontinued when bodying of the ingredients was imminent. Additional xylene was added and the viscosity of the solution adjusted to 100 cstks. The solution was pigmented with titania, applied in a thickness of 1.2 mils to steel panels and cured in one-half hour at 200° C. to a hard white finish. After being subjected for a period of 500 hours to a temperature of 200° C. the coatings were found to be in a satisfactory condition. It was also found that the coatings were resistant to deterioration when immersed in boiling water for 3 hours and when immersed in 3 percent solutions of hydrochloric acid and sodium hydroxide for 70 hours.

Example XI

A polysiloxane identical in composition to that employed in Example X with the exception that it possessed an ethoxy group to silicon atom ratio of .46, a molecular weight of 1600 and contained 16 percent by weight of ethoxy groups was reacted with one equivalent weight of 2,2-bis (4-hydroxyphenyl) propane in the presence of a small amount of a potassium silanolate catalyst (approximately 0.2 percent by weight of potassium of the weight of the reactants) and a xylene solvent. The reaction was conducted at a temperature of from about 200° C. to about 250° C. and was continued until bodying of the reaction mixture was imminent at which time additional xylene was added and the viscosity of the solution adjusted to about 100 cstks. The solution was pigmented with titania, applied in a thickness of 1.3 mils to steel panels and cured in one-half hour at 200° C. to a hard, high-gloss white finish. After exposure to a temperature of 200° C. for a period of 600 hours it was found that the coatings had retained their initial high gloss and color characteristics. It was also found that the coatings were resistant to deterioration when immersed in boiling water for 3 hours and when immersed in 3 percent solutions of hydrochloric acid and sodium hydroxide for 70 hours.

*Example XII*

Following the procedure disclosed in Example IX approximately one equivalent weight (300 grams) of a phenyl polysiloxane prepared by treating a mixture comprising 60 mole percent phenyltrichlorosilane and 40 mole percent diphenyl dichlorosilane with a water-ethanol mixture and containing 15 percent by weight of ethoxy groups was reacted with approximately one equivalent weight 2,2-bis (4-hydroxyphenyl) propane in the presence of a small amount of a potassium silanolate catalyst and sufficient xylene to insure solution of the ingredients. The product obtained was dissolved in sufficient xylene to obtain a solution having a viscosity of 100 cstks. The solution was then pigmented with titania, applied in a thickness of 1.6 mils to steel panels and cured in one-half hour at 200° C. to a hard, high-gloss white finish. After exposure to a temperature of 200° C. for a period of 600 hours it was found that the coatings had retained their initial high gloss and color characteristics. It was also found that the coatings were resistant to deterioration when immersed in boiling water for 3 hours and when immersed in 3 percent solutions of hydrochloric acid and sodium hydroxide for 70 hours.

*Example XIII*

Approximately one equivalent weight (177 grams) of a phenyl and methyl polysiloxane having a hydrocarbyl group to silicon atom ratio of 1.4, a phenyl group to methyl group ratio of .75, an ethoxy group to silicon atom ratio of 0.80, a molecular weight of 750 and containing 25.4 percent by weight of ethoxy groups and one equivalent weight (100 grams) of bis (2-hydroxyphenyl) methane together with a small amount of potassium silanolate catalyst and sufficient xylene to aid solution of the ingredients were charged to a 3-liter, 3-neck flask equipped with stirrer, thermometer, condenser and take-off trap. The ingredients were heated at a temperature in the range of 200° C. and ethanol and toluene evolved during the reaction. Heating was discontinued when the viscosity increase of the reaction mixture indicated that bodying was imminent at which time additional xylene was added and the viscosity of the solution adjusted to about 100 cstks. The solution was pigmented with titania, applied to steel panels in a thickness of 1.5 mils and cured in one-half hour at a temperature of 200° C. to a hard white finish. After a brief period of heat aging the coatings were found in a satisfactory condition. It was also found that the coatings were resistant to deterioration when immersed in boiling water for 3 hours and when immersed in 3 percent solutions of hydrochloric acid and sodium hydroxide for 70 hours.

*Example XIV*

One equivalent weight (177 grams) of a polysiloxane identical in composition to that employed in Example XIII was reacted with one equivalent weight (50 grams) of 2-hydroxyphenyl 4-hydroxyphenyl methane and one-half equivalent weight (50 grams) bis (2-hydroxyphenyl) methane in the presence of a small amount of a potassium silanolate catalyst at a temperature in the range of 200° C. to 250° C. Heating was continued until the viscosity increase of the reaction mixture indicated that bodying was imminent at which time additional xylene was added and the viscosity of the solution adjusted to about 100 cstks. The solution was then pigmented with titania, applied to steel panels in a thickness of 1.5 mils and cured in one-half hour at a temperature of 200° C. to a hard white finish. After a brief period of heat aging the coatings were found in a satisfactory condition. It was also found that the coatings were resistant to deterioration when immersed in boiling water for 3 hours and when immersed in 3 percent solutions of hydrochloric acid and sodium hydroxide for 70 hours.

*Example XV*

Approximately one equivalent weight (177 grams) of a phenyl polysiloxane identical in composition to that employed in Example XIII and one equivalent weight (100 grams) of bis (4-hydroxyphenyl) methane were reacted in the presence of a small amount of a potassium silanolate catalyst and a xylene solvent in a 3-liter, 3-neck flask equipped with stirrer, thermometer, condenser and take-off trap. The ingredients were heated at a temperature in the range of 200° C. to 250° C. and ethanol and toluene evolve during the reaction. Heating was continued until the viscosity increase of the reaction mixture indicated that bodying was imminent at which time additional xylene was added and the viscosity of the solution adjusted to about 100 cstks. The solution was pigmented with titania, applied to steel panels in a thickness of 1.5 mils and cured in one-half hour at a temperature of 200° C. to a hard white finish. After a brief period of heat aging the coatings were found in a satisfactory condition. It was also found that the coatings were resistant to deterioration when immersed in boiling water for 3 hours and when immersed in 3 percent solutions of hydrochloric acid and sodium hydroxide for 70 hours.

What is claimed is:

1. A composition of matter comprising the reaction product of one equivalent weight of an organopolysiloxane and from 0.8 to 2.0 equivalent weights of bis (hydroxyphenyl) substituted alkane having from 1 to 4 carbon atoms in the alkane group thereof, said organopolysiloxane having (a) from 1.0 to 1.6 monovalent silicon-bonded hydrocarbyl groups per silicon atom, said hydrocarbyl groups being taken from groups consisting of phenyl and methyl groups, the amount of said silicon-bonded methyl groups present varying from 0 percent to about 60 percent of the amount of the total silicon-bonded hydrocarbyl groups present, and (b) silicon-bonded hydrocarbyloxy groups, said hydrocarbyloxy groups being taken from the class consisting of alkoxy and aryloxy groups and being present in an amount by weight of from about 5 percent to about 40 percent of the total weight of said organo polysiloxane, said reaction product including a plurality of recurring polysiloxane portions connected by divalent bis (oxyphenyl) substituted alkane radicals through silicon-oxygen-carbon linkages, the 2 oxyphenyl groups of each of said bis (oxyphenyl) substituted alkane radicals being attached to the same carbon atoms of the alkane group.

2. A composition of matter as defined in claim 1, wherein said bis (hydroxyphenyl) substituted alkane is bis (hydroxyphenyl) methane and wherein said divalent bis (oxyphenyl) substituted alkane radicals are divalent bis (oxyphenyl) methane radicals.

3. A composition of matter as defined in claim 1, wherein said bis (hydroxyphenyl) substituted alkane is bis (hydroxyphenyl) propane and wherein the divalent bis (oxyphenyl) substituted alkane radicals are divalent bis (oxyphenyl) propane radicals.

4. A composition of matter as defined in claim 1, wherein said bis (hydroxyphenyl) substituted alkane is 2,2-bis (hydroxyphenyl) propane and wherein said divalent bis (oxyphenyl) substituted alkane radicals are divalent 2,2-bis (oxyphenyl) propane radicals.

5. A process for preparing modified polysiloxanes which comprises reacting one equivalent weight of an organopolysiloxane having (a) from 1.0 to 1.6 silicon-bonded monovalent hydrocarbyl groups per silicon atom, said hydrocarbyl groups being taken from the class consisting of phenyl and methyl groups and the amount of said silicon-bonded methyl groups present varying from 0 percent to about 60 percent of the amount of said silicon-bonded hydrocarbyl groups; (b) silicon-bonded hydrocarbyloxy groups, said hydrocarbyloxy groups being taken from the class consisting of alkoxy and aryloxy groups and being present in an amount by weight of from about 5 percent to about 40 percent of the total weight of said organopolysiloxane, with from 0.8 to 2.0 equivalent weights of a bis (hydroxyphenyl) substituted alkane having from 1 to 4 carbon atoms in the alkane group thereof and having the two hydroxyphenyl groups of said bis(hydroxyphenyl)alkane attached to the same carbon atom of the alkane group, at a temperature of from about 180° C. to about 250° C.

6. A process for preparing modified polysiloxanes which comprises reacting one equivalent weight of an organopolysiloxane having (a) from 1.0 to 1.6 silicon-bonded monovalent hydrocarbyl groups per silicon atom, said hydrocarbyl groups being taken from the class consisting of phenyl and methyl groups and the amount of said silicon-bonded methyl groups present varying from 0 percent to about 60 percent of the amount of said silicon-bonded hydrocarbyl groups, (b) from 0.2 to 2.0 silicon-bonded hydrocarbyloxy groups per silicon atom, said hydrocarbyloxy groups being taken from the class consisting of alkoxy and aryloxy groups, the percent by weight of said hydrocarbyloxy groups being from about 5 percent to about 40 percent of the total weight of said organopolysiloxane, with from 0.8 to 2.0 equivalent weights of a bis (hydroxyphenyl) substituted alkane having from 1 to 4 carbon atoms in the alkane group thereof and having the two hydroxyphenyl groups of said bis (hydroxyphenyl)alkane attached to the same carbon atom of the alkane group, at a temperature of from about 180° C. to about 250° C.

7. A process for preparing modified polysiloxanes which comprises reacting one equivalent weight of an organopolysiloxane having (a) from 1.0 to 1.6 silicon-bonded monovalent hydrocarbyl groups per silicon atom, said hydrocarbyl groups being taken from the class consisting of phenyl and methyl groups and the amount of said silicon-bonded methyl groups present varying from 0 percent to about 60 percent of the amount of said silicon-bonded hydrocarbyl groups, (b) from 0.3 to 1.5 silicon-bonded alkoxy groups per silicon atom, the percent by weight of said alkoxy groups being from about 5 percent to about 40 percent of the total weight of said organopoly-siloxane, with from 0.8 to 2.0 equivalent weights of a bis (hydroxyphenyl) substituted alkane having from 1 to 4 carbon atoms in the alkane group thereof and having the two hydroxyphenyl groups of said bis-(hydroxyphenyl)alkane attached to the same carbon atom of the alkane group, at a temperature of from about 180° C. to about 250° C.

8. A process for preparing modified polysiloxanes which comprises reacting one equivalent weight of an organopolysiloxane having (a) from 1.0 to 1.6 silicon-bonded monovalent hydrocarbyl groups per silicon atom, said hydrocarbyl groups being taken from the class consisting of phenyl and methyl groups and the amount of said silicon-bonded methyl groups present varying from 0 percent to about 60 percent of the amount of said silicon-bonded hydrocarbyl groups, (b) from 0.3 to 1.5 silicon-bonded alkoxy groups per silicon atom, the percent by weight of said alkoxy groups being from about 5 percent to about 40 percent of the total weight of said organopolysiloxane, with from 0.8 to 2.0 equivalent weights of a bis (hydroxyphenyl) substituted alkane having from 1 to 4 carbon atoms in the alkane group thereof and having the two hydroxyphenyl groups of said bis(hydroxyphenyl)alkane attached to the same carbon atom of the alkane group, at a temperature of from about 180° C. to about 250° C. in the presence of a transesterification catalyst.

9. A process for preparing modified polysiloxanes which comprises reacting one equivalent weight of an organopolysiloxane having (a) from 1.0 to 1.6 silicon-bonded monovalent hydrocarbyl groups per silicon atom, said hydrocarbyl groups being taken from the class consisting of phenyl and methyl groups and the amount of said silicon-bonded methyl groups present varying from 0 percent to about 60 percent of the amount of said silicon-bonded hydrocarbyl groups, (b) from 0.3 to 1.5 silicon-bonded ethoxy groups per silicon atom, the percent by weight of said ethoxy groups being from about 5 percent to about 40 percent of the total weight of said organopolysiloxane, with from 0.8 to 2.0 equivalent weights of bis(hydroxyphenyl) substituted alkane having from 1 to 4 carbon atoms in the alkane group thereof and having the two hydroxyphenyl groups of each of said bis(hydroxyphenyl)alkanes attached to the same carbon atom of the alkane group, at a temperature of from about 180° C. to about 250° C.

10. A process for preparing modified polysiloxanes which comprises reacting one equivalent weight of an organopolysiloxane having (a) from 1.0 to 1.6 silicon-bonded monovalent hydrocarbyl groups per silicon atom, said hydrocarbyl groups being taken from the class consisting of phenyl and methyl groups and the amount of said silicon-bonded methyl groups present varying from 0 percent to about 60 percent of the amount of said silicon-bonded hydrocarbyl groups, (b) from 0.3 to 1.5 silicon-bonded ethoxy groups per silicon atom, the percent by weight of said ethoxy groups being from about 5 percent to about 40 percent of the total weight of said organopolysiloxane, with from 0.8 to 2.0 equivalent weights of bis (hydroxyphenyl) substituted alkanes having from 1 to 4 carbon atoms in the alkane group thereof and having the two hydroxyphenyl groups of each of said bis(hydroxyphenyl)alkanes attached to the same carbon atom of the alkane group, at a temperature of from about 180° C. to about 250° C. in the presence of a potassium silanolate catalyst.

11. A process for preparing modified polysiloxanes which comprises reacting one equivalent weight of an organopolysiloxane having (a) from 1.0 to 1.6 silicon-bonded monovalent hydrocarbyl groups per silicon atom, said hydrocarbyl groups being taken from the class consisting of phenyl and methyl groups and the amount of said silicon-bonded methyl groups present varying from 0 percent to about 60 percent of the amount of said silicon-bonded hydrocarbyl groups, (b) from 0.3 to 1.5 silicon-bonded ethoxy groups per silicon atom, the percent by weight of said ethoxy groups being from about 5 percent to about 40 percent of the total weight of said organopolysiloxane, with from 0.8 to 2.0 equivalent weights of bis (4-hydroxyphenyl) methane at a temperature of from about 180° C. to about 250° C.

12. A process for preparing modified polysiloxanes which comprises reacting one equivalent weight of an organopolysiloxane having (a) from 1.0 to 1.6 silicon-bonded monovalent hydrocarbyl groups per silicon atom, said hydrocarbyl groups being taken from the class consisting of phenyl and methyl groups and the amount of said silicon-bonded methyl groups present varying from 0 percent to about 60 percent of the amount of said silicon-bonded hydrocarbyl groups, (b) from 0.3 to 1.5 silicon-bonded ethoxy groups per silicon atom, the percent by weight of said ethoxy groups being from about 5 percent to about 40 percent of the total weight of said organopolysiloxane, with from 0.8 to 2.0 equivalent weights of 2,2-bis (4-hydroxyphenyl) propane at a temperature of from about 180° C. to about 250° C.

13. A process for preparing modified polysiloxanes which comprises reacting one equivalent weight of an organopolysiloxane having (a) from 1.0 to 1.6 silicon-bonded monovalent hydrocarbyl groups per silicon atom, said hydrocarbyl groups being taken from the class consisting of phenyl and methyl groups and the amount of said silicon-bonded methyl groups present varying from 0 percent to about 60 percent of the amount of said silicon-bonded hydrocarbyl groups, (b) from 0.2 to 2.0 silicon-bonded hydrocarbyloxy groups per silicon atom, said hydrocarbyloxy groups being taken from the class consisting of alkoxy and aryloxy groups, the percent by weight of said hydrocarbyloxy groups being from about 5 percent to about 40 percent of the total weight of said organopolysiloxane, with from 0.8 to 2.0 equivalent weights of a bis (hydroxyphenyl) substituted alkane having from 1 to 4 carbon atoms in the alkane group thereof and having the two hydroxyphenyl groups of said bis (hydroxyphenyl)alkane attached to the same carbon atom of the alkane group and a monohydric alcohol at a temperature of from about 180° C. to about 250° C.

14. A process for preparing modified polysiloxanes which comprises reacting one equivalent weight of an organopolysiloxane having (a) from 1.0 to 1.6 silicon-bonded monovalent hydrocarbyl groups per silicon atom, said hydrocarbyl groups being taken from the class consisting of phenyl and methyl groups and the amount of said silicon-bonded methyl groups present varying from 0 percent to about 60 percent of the amount of said silicon-bonded hydrocarbyl groups, (b) from 0.2 to 2.0 silicon-bonded hydrocarbyloxy groups per silicon atom, said hydrocarbyloxy groups being taken from the class consisting of alkoxy and aryloxy groups, the percent by weight of said hydrocarbyloxy groups being from about 5 percent to about 40 percent of the total weight of said organopolysiloxane, with from 0.8 to 2.0 equivalent weights of a bis (hydroxyphenyl) substituted alkane having from 1 to 4 carbon atoms in the alkane group thereof and having the two hydroxyphenyl groups of said bis(hydroxyphenyl)alkane attached to the same carbon atom of the alkane group and a polyhydric alcohol at a temperature of from about 180° C. to about 250° C.

15. A process for preparing modified polysiloxanes which comprises reacting one equivalent weight of an organopolysiloxane having (a) from 1.0 to 1.6 silicon-bonded monovalent hydrocarbyl groups per silicon atom, said hydrocarbyl groups being taken from the class consisting of phenyl and methyl groups and the amount of said silicon-bonded methyl groups present varying from 0 percent to about 60 percent of the amount of said silicon-bonded hydrocarbyl groups, (b) from 0.3 to 1.5 silicon-bonded ethoxy groups per silicon atom, the percent by weight of said ethoxy groups being from about 5 percent to about 40 percent of the total weight of said organopolysiloxane, with from 0.8 to 2.0 equivalent weights of 2,2-bis (4-hydroxyphenyl) propane and glycerol at a temperature of from about 180° C. to about 250° C.

16. A process for preparing modified polysiloxanes which comprises reacting one equivalent weight of an organopolysiloxane having (a) from 1.0 to 1.6 silicon-bonded monovalent hydrocarbyl groups per silicon atom, said hydrocarbyl groups being taken from the class consisting of phenyl and methyl groups and the amount of said silicon-bonded methyl groups present varying from 0 percent to about 60 percent of the amount of said silicon-bonded hydrocarbyl groups, (b) from 0.3 to 1.5 silicon-bonded ethoxy groups per silicon atom, the percent by weight of said ethoxy groups being from about 5 percent to about 40 percent of the total weight of said organopolysiloxane, with from 0.8 to 2.0 equivalent weights of 2,2-bis (4-hydroxyphenyl) propane and an aromatic alcohol at a temperature of from about 180° C. to about 250° C.

References Cited in the file of this patent
UNITED STATES PATENTS

| | | |
|---|---|---|
| 2,058,394 | Arvin | Oct. 27, 1936 |
| 2,438,055 | Hyde | Mar. 16, 1948 |
| 2,529,956 | Myles et al. | Nov. 14, 1950 |
| 2,687,398 | McLean | Aug. 24, 1954 |
| 2,695,276 | Hatcher | Nov. 23, 1954 |
| 2,755,269 | Moorehead | July 17, 1956 |